April 27, 1954  J. N. STRAUSS ET AL  2,676,676
TELESCOPIC SHOCK ABSORBER
Filed March 22, 1950

Inventors
John N. Strauss
Kenneth W. Cuffe
Attys

Patented Apr. 27, 1954

2,676,676

UNITED STATES PATENT OFFICE 2,676,676

TELESCOPIC SHOCK ABSORBER

John N. Strauss, Williamsville, and Kenneth W. Cuffe, Buffalo, N. Y., assignors to Houdaille-Hershey Corporation, Detroit, Mich., a corporation of Michigan Application March 22, 1950, Serial No. 151,168

2 Claims. (Cl. 188—88)

The present invention relates to improvements in telescopic shock absorbers and more particularly concerns novel means for controlling the flow of hydraulic fluid in the strokes of the piston of the shock absorber.

An important object of the present invention is to provide improved, simplified, highly efficient means for controlling the displacement of hydraulic fluid in the operation of a direct acting or telescopic shock absorber of the type in which a piston and a cylinder cooperate telescopically in the presence of hydraulic fluid filling the cylinder.

Another object of the invention is to provide improved fluid displacement control means in a direct acting shock absorber piston structure.

A further object of the invention is to provide an improved hydraulic fluid displacement control means for direct acting or telescopic shock absorbers which may be easily adapted in production to meet various predetermined service requirements.

Yet another object of the invention is to provide a novel hydraulic fluid displacement control valve structure which, upon the incorporation therein of certain operative relationships of elements can be depended upon to perform within a given predetermined operative range without post-assembly adjustments.

A still further object of the invention is to provide an improved telescopic shock absorber construction which is not only durable and dependable in service, but is also susceptible of unusually low cost manufacture so as to provide a competitively important commercial product.

Other objects, features and advantages of the present invention will be readily apparent from the following detailed description of a preferred embodiment thereof taken in conjunction with the accompanying drawing, in which.

Figure 1:
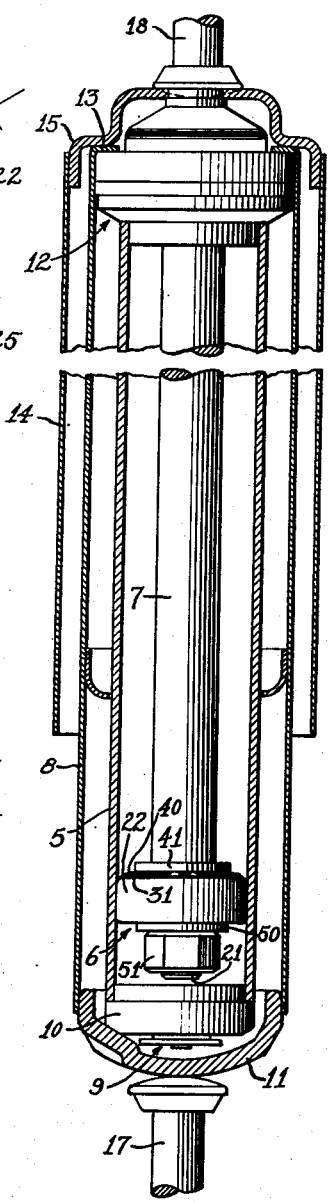
Figure 1 is a fragmental longitudinal sectional view through a telescopic shock absorber embodying the features of the present invention, and showing various parts in side elevation.

A direct acting or telescopic shock absorber of the kind with which the present invention is concerned, comprises (Figure 1) as principal components a cylinder 5 within which is maintained in service a fill of suitable hydraulic fluid affording resistance to relative axial reciprocable or telescopic movements of a piston assembly 6 carried by piston rod 7. As shown, the shock absorber assembly is in the collapsed condition in which it is normally packed for stock purposes prior to installation for service as, for example, in a vehicle between the sprung and unsprung portions of the vehicle, whereupon the piston assembly 6 will, of course, be in a normal service position approximately midway the length of the cylinder 5.

To accommodate fluid displacement and replenishment required for accommodation of the piston rod 7 in the reciprocations of the piston 6, a reservoir is provided by a reservoir casing tube 8 of larger diameter disposed concentrically about the cylinder 5 and communicating with the bottom of the cylinder through a foot valve assembly 9 of any preferred construction carried by a cage or casing 10 assembled with the lower end of the cylinder 5 and seated in a cup-shaped enclosure 11 secured to the lower end of the reservoir tube 8.

The end portion of the piston rod 7 extends slidably through a packing gland head assembly 12 secured on the upper end of the cylinder 5 and held in assembled relationship by a turned over retaining flange 13 on the upper end of the reservoir tube 8. A gravel guard tube 14 is carried by an upper protective cap 15 secured to the upper end of the piston rod. Suitable stud or bracket means 17 carried by the lower closure cap 11 and similar means 18 carried by the upper end of the piston rod 7 are provided for attachment of the shock absorber in operative association with the apparatus having relatively movable portions, such as the sprung and unsprung portions of a vehicle between which the snubbing and shock absorbing functions of the shock absorber unit are desirable.

In the operation of the shock absorber, rapid relative reciprocal movements of the cylinder 5 and the piston 6 are resisted within force-velocity limits determined by a cooperative relationship of the foot valve assembly 9 and valve mechanism carried by the piston assembly 6. Resistance to the compression stroke, that is, inward movement of the piston 6 is afforded primarily by the foot valve assembly 9 since during the compression stroke substantial hydraulic fluid must be displaced from the cylinder 5 to accommodate the piston rod 7. Resistance to compression displacement is afforded by valve mechanism in the piston 6 for displacement of hydraulic fluid from below the piston to the area within the cylinder above the piston. During rebound, that is, movement of the piston 6 outwardly, relatively free replenishment flow of hydraulic fluid from the reservoir into the cylinder is permitted by the foot valve 9 while substantial resistance to rebound displacement of hydraulic fluid from above the piston 6 into the space below the piston is afforded by valve mechanism in the piston.

Figure 3:
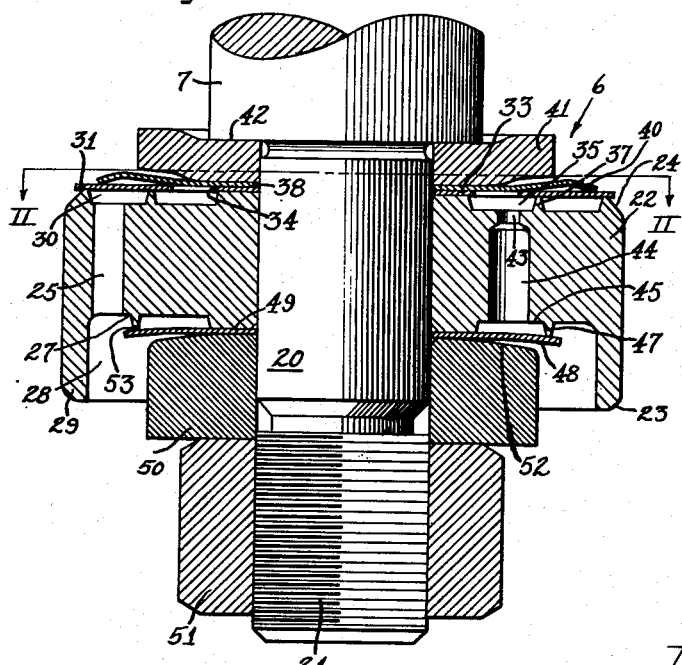
Figure 3 is a vertical sectional view taken substantially on the line III—III of Figure 2.

According to the present invention the valve mechanism in the piston assembly 6 embodies novel means for hydraulic fluid displacement control. To this end, as best seen in Figure 3, the lower end of the piston rod 7 is formed with a reduced diameter portion 20 having a lower threaded extremity section 21. Slidably assembled on the reduced diameter piston rod portion 20 is a piston body 22 of appropriate ring-shape and having an external diameter for slidably engaging the inner wall of the cylinder 5. The lower outside corner of the piston body is chamfered or rounded off and smoothly finished as shown at 23. At its upper outside corner, the piston body is chamfered and smoothly finished as shown at 24. This promotes smooth, substantially friction-less operation and enhances slight lubricating leakages of hydraulic fluid past the piston.

Figure 2:
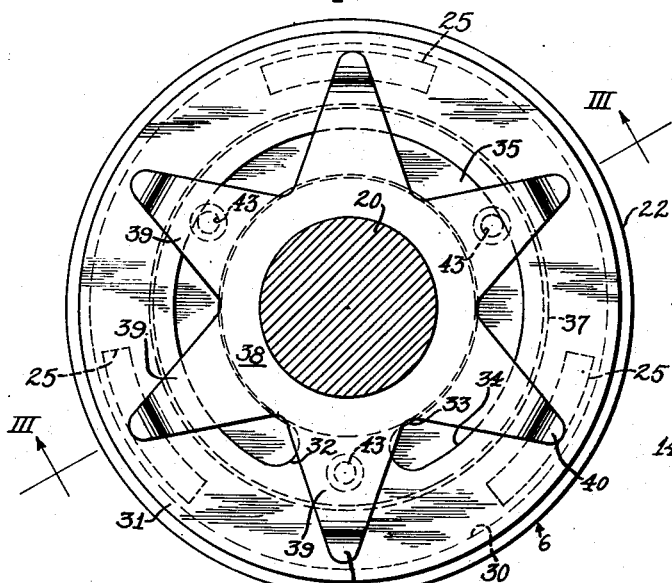
Figure 2 is an enlarged transverse sectional plan view through the piston assembly of the shock absorber, taken substantially on the line II—II of Figure 3.

For compression fluid displacement or blowoff, the piston body 22 is provided with an annular series of flow area compression displacement ports 25 extending in axial direction therethrough and communicating at their lower ends with an annular channel 27 at the outer margin of the roof of a cavity 28 in the lower face of the piston body 22 and defined by a skirt 29. At their upper ends, the compression displacement ports 25 communicate with an upwardly opening annular channel 30 in the outer margin of the upper face of the piston body 22. As best seen in Figure 2, the compression displacement or blow-off ports 25 are preferably equidistantly annularly spaced and may be of arcuate cross-section, being of substantially greater width than depth, although where desirable drilled holes of appropriate dimensions may be used.

Relatively free and only slightly resisted compression fluid displacement flow through the ports 25 is permitted while return or rebound flow of hydraulic fluid is prevented by a disk valve 31 overlying the channel 30. By preference the disk valve 31 comprises a thin reed-like structure including as the principal working element thereof an outer annulus attached by a narrow neck 32 of material with an inner concentric attachment annulus 33, all formed in one piece as a single stamping. This construction has two purposes, the first of which is to provide means whereby the disk valve 31 is attached in concentric relation about the reduced diameter piston rod portion 20 against displacement in its plane, while enabling the outer valve annulus of the disk valve to move to unseated relation to the compression displacement fluid channel 30 without undue restraint since the narrow connecting neck 32 is of such small area and high flexibility that it will yield readily to bend flexibly when the outer valve annulus of the disk valve 31 rises from its seat. The second purpose of the connected outer and inner annulus construction of the disk valve 31 is to provide a slot 34 of substantial width and full circular C-shape extent except for the narrow solid neck 32 to afford a substantially free upward exposure and opening for a second, smaller diameter upwardly opening annular channel 35 in the upper face of the piston body 22 and separated from the compression displacement or blow-off channel 30 by a narrow solid land 37.

The disk valve 31 is normally resiliently biased toward and onto its seat by a star spring 38 formed as a stamping from suitable thin gauge spring material, centrally apertured to fit about the reduced diameter portion 20 of the piston rod and superimposed upon the valve disk 31. The star spring has a plurality of radial resilient fingers 39, the tips of which are angled downwardly to provide pressure tips 40 which bear against the upper face of the outer annulus of the disk valve 31 and maintain the body portions of the fingers 39 under resilient stress working against the hold down tips 40 and thus against the disk valve 31.

Following initial moderately resisted compression blow-off unseating of the disk valve 31 in opposition to the spring bias afforded by the star spring arms 39, further unseating of the disk valve 31 is resisted with increasing resilient force by engagement of the upwardly humped, stressed star spring fingers 39 with an overlying rigid retainer or limit disk flange 41, a radial outer upwardly offset portion of which opposes the star spring fingers and a radially inner portion of which is centrally apertured and engages about the reduced diameter piston rod portion 20 and abuts a shoulder 42 on the piston rod above the reduced diameter portion.

Rebound pressure fluid displacement or blow-off occurs by passage of hydraulic fluid from above the piston assembly 6 through the C-shaped slot 34 in the disk valve 31, into the inner annular channel 35 and thence through a series of ports or orifices 43 and bores 44 extending downwardly therefrom into a downwardly opening inner annular channel 45 in the roof of the cavity 28 in the piston body and separated by an annular land 47 from the outer annular channel 27.

Hydraulic fluid displacement on rebound is resisted by a control valve 48 which also checks compression displacement through the passages 43—44. The valve 48 is in the form of a centrally apertured disk maintained in centered relation about the reduced diameter piston rod portion 20 and bearing against the annular rib or land 47 acting as a seat for the outer margin of the valve disk. At its inner margin the valve disk bears radially inwardly of the channel 45 against a downwardly facing shoulder 49 on the piston body cavity roof and inset relative to the valve seating edge defined by the land 47. The disk 48 is formed as a stamping from appropriate quality spring steel or other spring material of appropriate gauge and which prior to assembly in the piston is preferably flat. If desired, a plurality of the disks 48 may be used in a laminated relation in the valve.

In the piston assembly, the rebound blow-off controlling valve 48 is maintained under spring tension by stressing the same against the piston body shoulder 49 by means of a stressing plate or ring 50 which encircles the reduced diameter portion 20 of the piston rod and is driven upwardly against the radially inner portion of the disk valve 48 by means of a nut 51 threaded onto the threaded extremity portion 21 of the piston rod. The same thrust of the nut 51 which drives the stressing ring 50 against the disk valve 48 also drives the piston body 22 toward the piston rod shoulder 42 and thus securely clamps the disk valve hub 33, the star spring 38 and the limiting and retainer ring 41 against the shoulder 42.

In the compression stroke of the piston, the disk valve 48, of course, checks compression displacement of fluid into the rebound blow-off displacement channel 45. Upon requirement for rebound fluid displacement, the pre-stressed disk valve 48 affords substantial initial resistance to fluid displacement determined by the weight of the disk valve 48 and its pre-loaded stress. This is desirable since it is among other things a means for hydraulically simulating but with greater uniformity and constancy, suspension friction in the vehicle with which the shock absorber is associated, especially where mechanical friction has been eliminated as is the case in most coil spring suspensions. Of course, as a separate control factor, or as a control factor in combination with the pre-loaded stress of the spring disk valve 48, the particular size of the individual orifices 43 may be utilized to afford orifice flow resistance to rebound fluid displacement. It will thus be apparent that by a proper correlation of the orifice flow area provided by the orifices 43, and proper selection of the resiliency or thickness of the disk valve 48 and the pre-stress of the disk structure 48, various predetermined service requirements can be anticipated in production. As best seen in Figure 2, there are three of the orifices 43, but it will be appreciated that the number and size of the orifices 43 may be varied as required to meet various operating or service conditions that must be met in use of the particular shock absorber.

Means are provided for progressively increasing the flow resistance rate or stress of the disk valve 48 as it is blown open on rebound. Herein such means comprises the simple expedient of providing a symmetrical curved crown contour 52 on the valve stressing plate or ring 50 opposing the disk valve 48. Hence, by having the crown contour 52 on a radial curvature which is less, or, in other words, of greater radius, than the natural curvature of the opposing surface of the disk valve 48 under uncontrolled deflection, in the closed condition of the valve the surface thereof is spaced from the crown contour 52 progressively from the inner margin radially outwardly. This effects progressive engagement by the opposing surface of the valve disk structure with the crown contour from the radially inner portion of the contour toward the outer periphery as the disk valve 48 is blown open and deflected by the hydraulic fluid displaced on rebound. As a result, as the deflection of the disk valve 48 increases on rebound, the resistance to deflection increases progressively as the area of the disk structure progressively engages against the crown contour of the stressing member 50, thus effecting a progressive force-velocity build-up that increases proportionately to the point of full deflection of the disk valve 48 which is attained and limited by full engagement of the disk valve against the crown contour 52. It will be appreciated that by appropriate contouring of the crown surface 52 according to predetermined specifications, different valve control relationships can be attained to meet various service requirements.

A further advantage of the progressively increasing contact diameter between the crown contour 52 and the valve disk 48 resides in that the point of maximum stress of the disk valve structure travels over a substantial radial area of the disk structure during operation and thus avoids the danger of permanent set or fatigue of the disk structure and greatly prolongs the useful life of the disk structure.

For normal shock free movements of the piston 6 in the cylinder 5 metered orifice displacement flow of hydraulic fluid is accommodated through one or more metering orifices which may conveniently be provided as coined or otherwise formed groove 53 in the valve seat rib 47 to bypass the valve 48.

It will thus be apparent, that although the piston assembly 6 comprises only a few, simple parts, a wide range of operating and service conditions can be provided for by simple predetermined dimensional variations and relationships of certain elements. Thus, rebound fluid displacement control can be predetermined for any given working requirements by the correlated proportions and dimensions of the rebound orifices 43, the disk valve 48, the crown contour 52 and the pre-stress of the disk structure 48. All of the parts of the piston assembly can be made by simple mass production methods of manufacture as stampings, moldings, machined parts or castings.

It will be understood that modifications and variations may be effected without departing from the scope of the novel concepts of the present invention.

We claim as our invention:

1. In combination in a direct-acting shock absorber control valve, a piston body having fluid passage therethrough for displacement of fluid on the compression stroke of the piston body, a valve disk checking flow of fluid in the opposite direction through a second passage on the rebound stroke of the piston body, said valve disk being secured against movement on one margin and being deflectable toward its opposite margin for opening said passage in response to fluid pressure through said passage against the valve disk, and means for limiting the deflectional opening movement of the valve disk, said means comprising an abutment having a curved contoured crown having a curvature outwardly from its center which is less than the natural curvature of the disk under uncontrolled deflection opposing the face of the disk opposite that against which fluid pressure is exerted from said passage and normally lying in spaced relation to said face but progressively engageable by the valve disk as the valve disk is forced open by fluid pressure to progressively increase the deflectional resistance of the valve disk and thereby progressively control the rate of flow past said valve disk.

2. In combination in a direct-acting shock absorber piston construction, a piston rod having a reduced diameter lower end portion, a centrally apertured piston body assembled on said lower end portion, said piston body having compression displacement and rebound displacement fluid passages therethrough, means on the upper side of the piston body for controlling the compression flow passages, a centrally apertured disk valve assembled about the reduced diameter portion of the piston rod and engaging against the lower side of the piston body said disk valve being deflectable under pressure to control the rebound displacement passages, a tensioning ring assembled about the reduced diameter stem portion for clamping the inner margin of the disk valve in place against said piston body, and a nut threaded onto the reduced diameter stem portion and driving said tensioning ring into clamping relation to the disk valve, said tensioning ring having a rounded contour crown opposing the disk valve, said crown having a curvature of greater radius than the natural curvature of the valve disk under uncontrolled deflection, whereby deflection of the disk by fluid on the rebound stroke of the piston will cause the disk to flex about a point which is progressively further from the axis of the disk as the disk is placed under progressively higher fluid pressures.

References Cited in the file of this patent

UNITED STATES PATENTS

| Number | Name | Date |
|---|---|---|
| 2,138,513 | Rossman et al. | Nov. 29, 1938 |
| 2,357,920 | Whisler, Jr. | Sept. 12, 1944 |
| 2,465,680 | Focht | Mar. 29, 1949 |

FOREIGN PATENTS

| Number | Country | Date |
|---|---|---|
| 683,212 | France | June 10, 1930 |
| 120,179 | Australia | July 26, 1945 |
| 123,526 | Australia | Feb. 20, 1947 |